United States Patent [19]

Hofmann et al.

[11] Patent Number: 4,824,265

[45] Date of Patent: Apr. 25, 1989

[54] CAGE FOR TAPERED ROLLER BEARING

[75] Inventors: Heinrich Hofmann; Günther Glas, both of Schweinfurt, Fed. Rep. of Germany

[73] Assignee: FAG Kugelfischer Georg Schafer (KGaA), Fed. Rep. of Germany

[21] Appl. No.: 234,423

[22] Filed: Aug. 19, 1988

[30] Foreign Application Priority Data

Aug. 29, 1987 [DE] Fed. Rep. of Germany ....... 3728877

[51] Int. Cl.4 .............................................. F16C 33/46
[52] U.S. Cl. .................................... 384/560; 384/571; 384/572; 384/576
[58] Field of Search ............... 384/560, 571, 576, 572, 384/577, 526, 576

[56] References Cited

U.S. PATENT DOCUMENTS

| 2,105,013 | 1/1938 | Scribner | 384/560 |
| 3,260,333 | 7/1966 | Benson et al. | 384/576 |
| 4,707,152 | 11/1987 | Neese | 384/572 |
| 4,728,204 | 3/1988 | Colanzi et al. | 384/576 |

Primary Examiner—Lenard A. Footland
Attorney, Agent, or Firm—Ostrolenk, Faber, Gerb & Soffen

[57] ABSTRACT

A tapered roller bearing has its rollers guided between radially outwardly projecting lips at the small side and large side of the bearing inner ring. A cage for the bearing includes webs for separating adjacent rollers and includes a small side ring, with radially inward projections at the webs which are snapped behind the lip at the small side of the inner ring. The small side ring of the cage comprises approximately radially directed undulations with radially outward crests between the cage webs.

10 Claims, 1 Drawing Sheet

CAGE FOR TAPERED ROLLER BEARING

BACKGROUND OF THE INVENTION

The present invention relates to a cage for a tapered roller bearing.

Tapered roller bearings generally have a bearing inner ring which is provided on both axial sides with rims or lips for guiding and holding of the tapered rollers. The rollers are mounted together with the cage by being pushed in their assembled condition over the rim or lip at the smaller side of the inner ring of the bearing until the rollers snap radially behind that lip. This is made possible either because the pocket play of the rollers is very large, so that the rollers can move away radially, or because the radially small rim or lip is made radially short. Both of these measures have substantial disadvantages. In the former case, there is no precise guidance or holding of the rollers in the bearing. In the latter case, there is a danger that at least individual rollers will fall out, even if high precision of the parts is maintained at high expense.

In another possible mounting of the rollers, after the rollers are installed on the inner ring, certain sections of the cage are deformed so as to form holding noses. In this case, a radially taller lip or rim of the bearing ring can be used. But subsequent additional, expensive measures are then necessary to later deform the cage sections.

SUMMARY OF THE INVENTION

The object of the present invention is to improve a tapered roller bearing to avoid the above disadvantages so that, with simple means, there is dependable holding of the set of rollers on the inner ring of the bearing, with precise guidance of the rollers and without the need for additional plastic deformation of the cage after assembly.

The tapered roller bearing of the invention includes a radially outer ring and a radially inner ring with respective raceways in which tapered bearing rollers are disposed. The inner ring has a radially small side and a radially large side. At least the radially small side has a radially outwardly projecting lip or rim, and the radially large side may also have such a lip or rim. The rollers are held and guided at the small side lip or between the small and large side lips.

The invention particularly concerns the cage used for separating the rollers of the bearing. The cage includes respective webs between adjacent rollers for separating the rollers. The cage has a small side ring which is toward the radially small side of the inner ring and is axially beyond the smaller ends of the tapered roller bearings. The cage small side ring is comprised of approximately radially directed undulations and is therefore generally sinusoidal in shape. The radially outward crests of those undulations generally lie in the regions between the webs of the cage, while the radially inward crests of the cage are generally at the webs. The undulations allow elastic stretching of the small side ring of the cage, allowing an increase in its diameter and its circumference which enables the cage to be installed over the radially outwardly projecting lip of the inner ring.

The cage has a series of radial projections located generally at the small side ring of the cage and projecting radially inwardly and also each generally located in the region of a respective web of the cage. The projections are of a radial length as to be caught axially inward of the small side lip on the inner ring. The cage is comprised of sufficiently flexible and resilient material that to install the cage with the rollers in the inner ring, the cage can be expanded to raise the projections above the lip of the inner ring. The resilience of the cage will restore the projections to their position behind the lip of the inner ring and thereby position the cage.

Dependable holding of the rollers behind the small lip or rim is obtained through projections provided in the region of the webs of the cage, which snap behind the small rim or lip. Both the radial length of these projections and the height of the rim can be made large because the small side ring of the cage is comprised of approximately radially directed, sinusoidally curved undulations. The undulations substantially increase the elasticity of this part of the cage which permits the expansion of the small side ring as necessary upon the mounting. Despite radially tall projections or a tall rim, there is therefore no danger of the small side ring being damaged or destroyed upon mounting of the cage into the inner ring. The danger of damage to the rollers is also substantially reduced because they are guided without force over the rim or lip. Widening forces applied on the cage small side ring during the cage and roller mounting act only on the cage projections and the inner ring lip or rim. Furthermore, no additional work on the cage is necessary in order to obtain a structural unit.

In a specific embodiment, because the undulation crests lie between the axially extending webs that extend between the side rings of the cage and the separate rollers, easy elastic bending up of those webs towards the outside is possible, and the small rim or lip can be made relatively tall without any contact with the cage.

Federal Republic of Germany Patent Application DE-AS No. 16 25 643 discloses a cage for tapered roller bearings in which the small side ring has radial undulations. But, in that case, that cage ring is deformed only in order to produce a conical shape of the cage. Furthermore, no holding projections are provided on the cage.

Other objects and features of the present invention are apparent from the following description of the preferred embodiments of the invention considered in conjunction with the accompanying drawings.

DESCRIPTION OF THE PREFERRED EMBODIMENT

Figure 1:
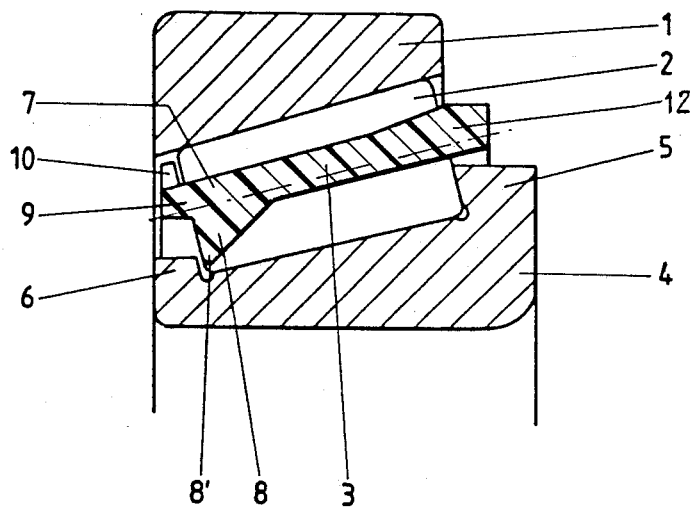
FIG. 1 is a partial cross-section through a tapered roller bearing according to the invention.

In FIG. 1, the tapered roller bearing comprises an outer ring 1, tapered rollers 2, which are separated by a window cage 3, and an inner ring 4. The inner ring 4 has a large axially wide rim or lip 5 of greater radial height at the axial side of the inner ring that is radially larger, for the axial guidance of the rollers 2 in operation. At the axial side of the inner ring that is radially smaller, the inner ring 4 has a small rim 6 of shorter radial height, which serves as a holding rim for and axially guides the rollers. In this way, the set comprised of the rollers 2 and the cage 3 in their unmounted condition form a structural unit with the inner ring 4.

The cage 3 comprises axial webs 7 which join axially separated cage side rings 9 and 12. There is a small side ring 9 axially outward of the smaller ends of the rollers. There is a large side ring 12 axially outward of the larger ends of the rollers. In the circumferential region of each of the webs 7, the cage 3 is provided with respective radially inward projections 8 which are axially generally near, and are axially just inward of the small side ring 9. The tips 8' of the projections engage behind the small rim 6 of the inner ring to dependably axially fix the structural unit 2, 3 on the inner ring 4 without sensitivity to tolerance.

Figure 2:
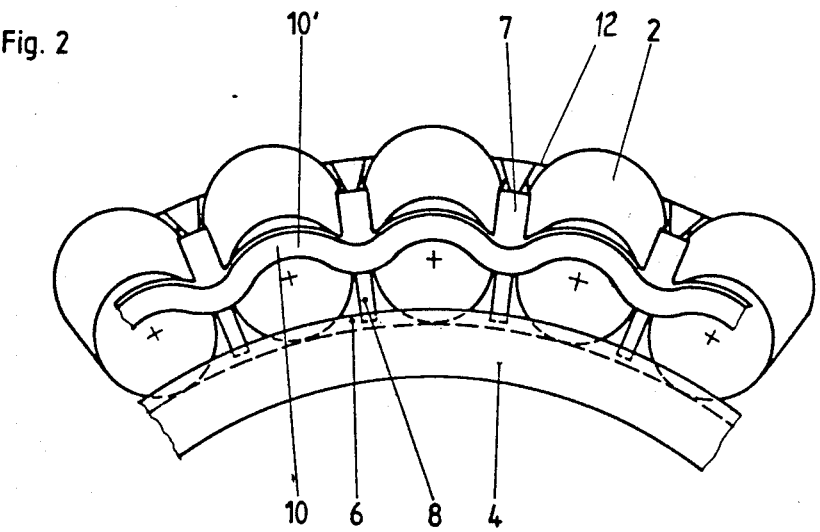
FIG. 2 is a partial section of the tapered roller bearing of FIG. 1, seen in axial top view from the small side ring.

During sliding of the rollers 2 over the rim 6, the radially directed widening of the diameter of these projections 8 is considerably facilitated by the small side ring 9 of the cage 3 comprising approximately radially directed undulations 10, as shown in FIG. 2. The undulations are preferably sinusoidal crests. To facilitate its mounting, the cage is preferably comprised of a flexible, resilient plastic, or the like material, which can be stretched for cage installation and which generally restores to its unstretched shape so that the projections snap behind the inner ring lip.

The greater elasticity thus obtained results in better deformability of the cage small side ring 9, without that ring or the rollers 2 being damaged upon roller and cage installation. The undulation crests 10' are directed radially outward in the region between the webs 7. In this way, they are prevented from coming into contact with, and grinding down, the small edge. The inward crests of the undulations 10 are at the webs.

Although the present invention has been described in connection with a preferred embodiment thereof, many other variations and modifications will now become apparent to those skilled in the art. It is preferred, therefore, that the present invention be limited not by the specific disclosure herein, but only by the appended claims.

What is claimed is:

1. A tapered roller bearing comprising:
   a tapered outer ring;
   a tapered inner ring radially inward of the outer ring, the inner ring having a radially smaller side and having a radially outwardly projecting lip at the radially smaller side;
   a plurality of tapered rollers each having a smaller end, the rollers being disposed between the inner and the outer rings;
   a window cage disposed between the inner and the outer rings of the bearing, the cage comprising a small side cage ring toward the radially smaller side of the bearing inner ring and beyond the smaller end of the bearing rollers, and a plurality of cage webs spaced at intervals around the cage small side ring, the webs being positioned for separating adjacent ones of the rollers of the bearing;
   the small side ring of the cage comprising approximately radially directed undulations extending around the cage side ring;
   the cage having radially inwardly directed projections which are sized to snap into the space axially inward of the lip of the inner ring, thereby positioning the cage with respect to the inner ring; the small side ring of the cage being of sufficiently flexible and resilient material to enable the small side ring to expand sufficiently to permit the projections from the cage to pass over the lip on the inner ring and to enable the small side ring to contract and to define the undulations more sharply for causing the cage projections to snap behind the bearing inner ring lip.

2. The tapered roller bearing of claim 1, wherein the cage projections are located in the circumferential regions of the webs of the cage.

3. The tapered roller bearing of claim 2, wherein the cage projections are near the small side ring of the cage.

4. The tapered roller bearing of claim 1, wherein the cage projections are near the small side ring of the cage.

5. The tapered roller bearing of claim 1, wherein the bearing inner ring has a radially larger side, and the rollers each have a wider end; the cage includes a large side ring toward the radially larger side of the inner ring and axially outward of the wider ends of the bearing rollers; and the webs being joined to the large side ring of the cage.

6. The tapered roller bearing of claim 5, wherein the inner ring has a second radially outwardly projecting lip at the larger side and the rollers being guided and held between the small side lip and the large side lip of the inner ring.

7. The tapered roller bearing of claim 1, wherein the inner ring has a second radially outwardly projecting lip at the axial end thereof that is radially larger, and the rollers being guided and held between the small side lip and the large side lip of the inner ring.

8. The tapered roller bearing of claim 1, wherein the undulations are generally sinusoidal.

9. The tapered roller bearing of claim 8, wherein the undulations have radially outward crests, and the radially outward crests lie in the regions between the cage webs.

10. The tapered roller bearing of claim 1, wherein the undulations have radially outward crests, and the radially outward crests lie in the region between the cage webs.

* * * * *